Figure 2A:
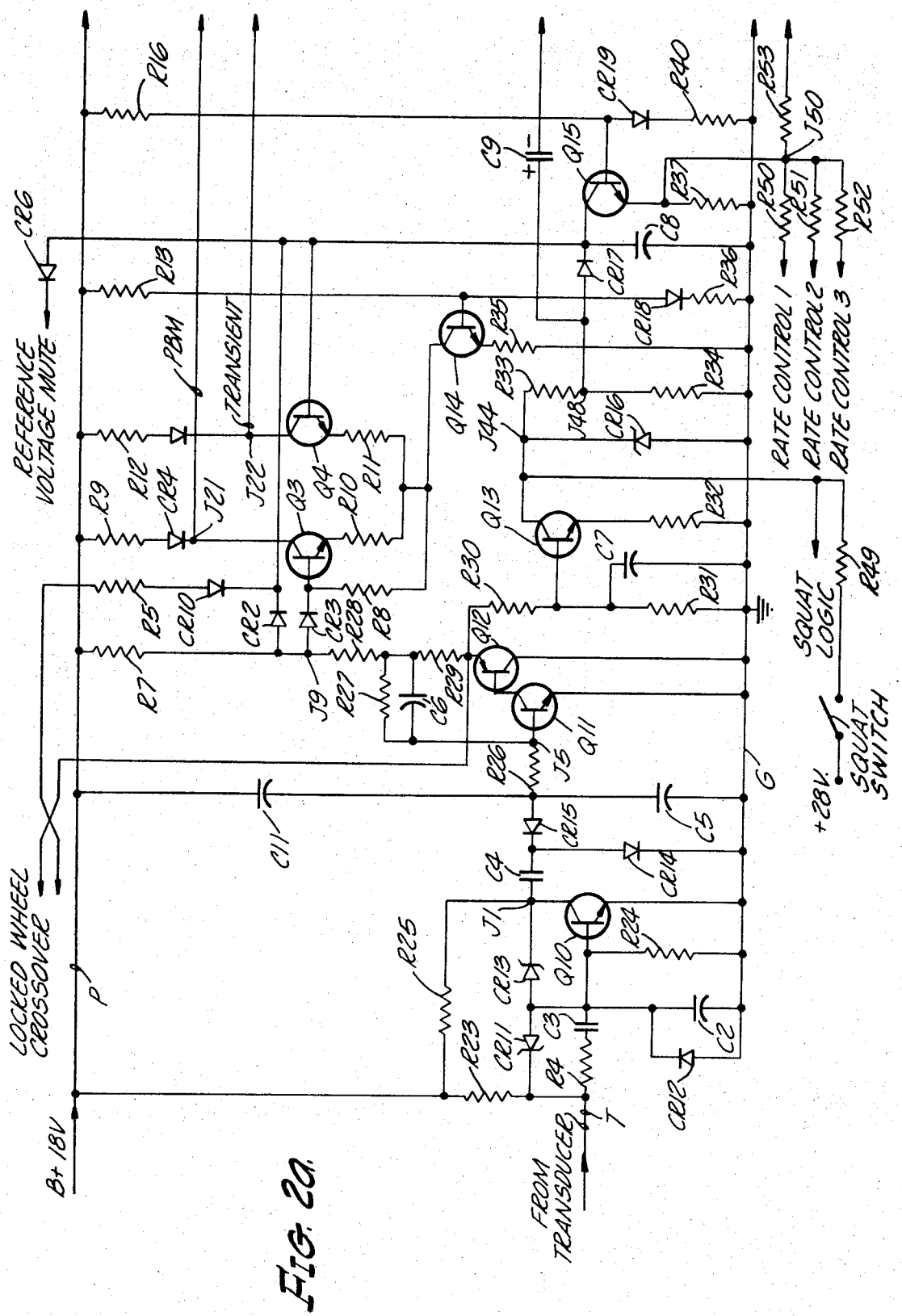

United States Patent [19]
Hirzel

[11] 3,729,234
[45] Apr. 24, 1973

[54] BRAKE CONTROL MODULATOR

[75] Inventor: Edgar A. Hirzel, Granada Hills, Calif.

[73] Assignee: Crane Co., Chicago, Ill.

[22] Filed: June 21, 1971

[21] Appl. No.: 154,959

Related U.S. Application Data

[60] Division of Ser. No. 871,439, Oct. 22, 1969, abandoned, which is a continuation-in-part of Ser. No. 665,072, Sept. 1, 1967, abandoned.

[52] U.S. Cl. ............ 303/21 BE, 188/181 C, 244/111, 303/20
[51] Int. Cl. ............................................... B60t 8/08
[58] Field of Search ........................... 180/82, 10 SE; 188/181; 303/20, 21; 317/5; 324/160–162; 340/52 R, 262–263; 244/111

[56] References Cited

UNITED STATES PATENTS

| | | | |
|---|---|---|---|
| 3,556,610 | 1/1971 | Leiber | 303/21 P |
| 3,604,760 | 9/1971 | Atkins | 303/21 BE |
| 3,610,362 | 10/1971 | Toyama et al. | 180/82 |
| 3,245,213 | 4/1966 | Thompson et al. | 303/21 EB |
| 3,547,501 | 12/1970 | Harned et al. | 303/21 BE |

*Primary Examiner*—Milton Buchler
*Assistant Examiner*—Stephen G. Kunin
*Attorney*—James P. Hume et al.

[57] ABSTRACT

A brake control is provided with a system for modifying the action of the brake application apparatus for the wheel of a vehicle. Information obtained from the rotation of the wheel is used to derive an analog signal indicating the braking condition. If the analog signal exceeds a predetermined threshold level, a modulating signal is produced. The modulating signal includes the time integral function of both the positive and negative variations of the analog signal from the threshold level. The circuitry for producing the modulating signal includes an integrating capacitor that is charged by said analog signal and that is discharged by current representing the predetermined threshold level.

8 Claims, 8 Drawing Figures

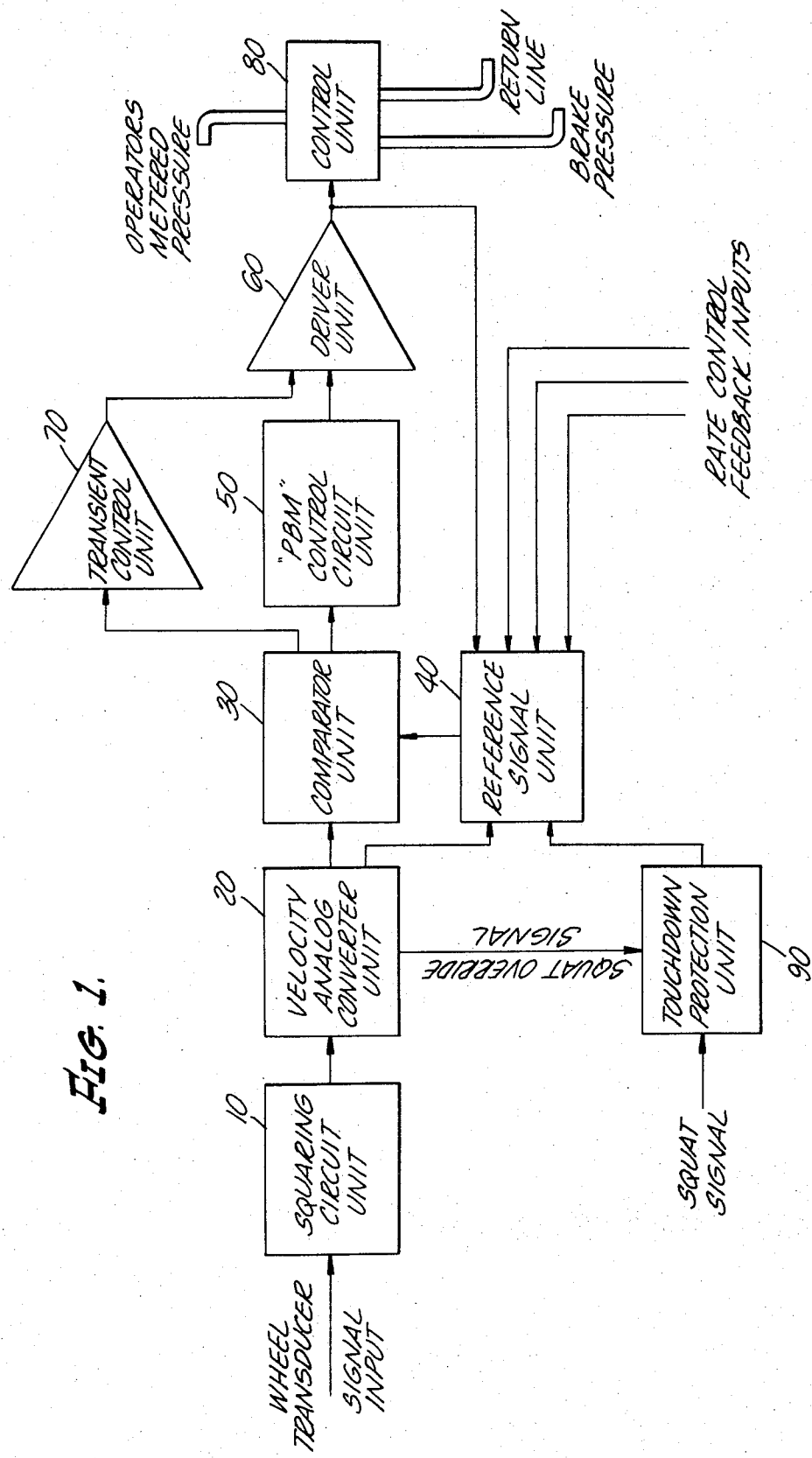

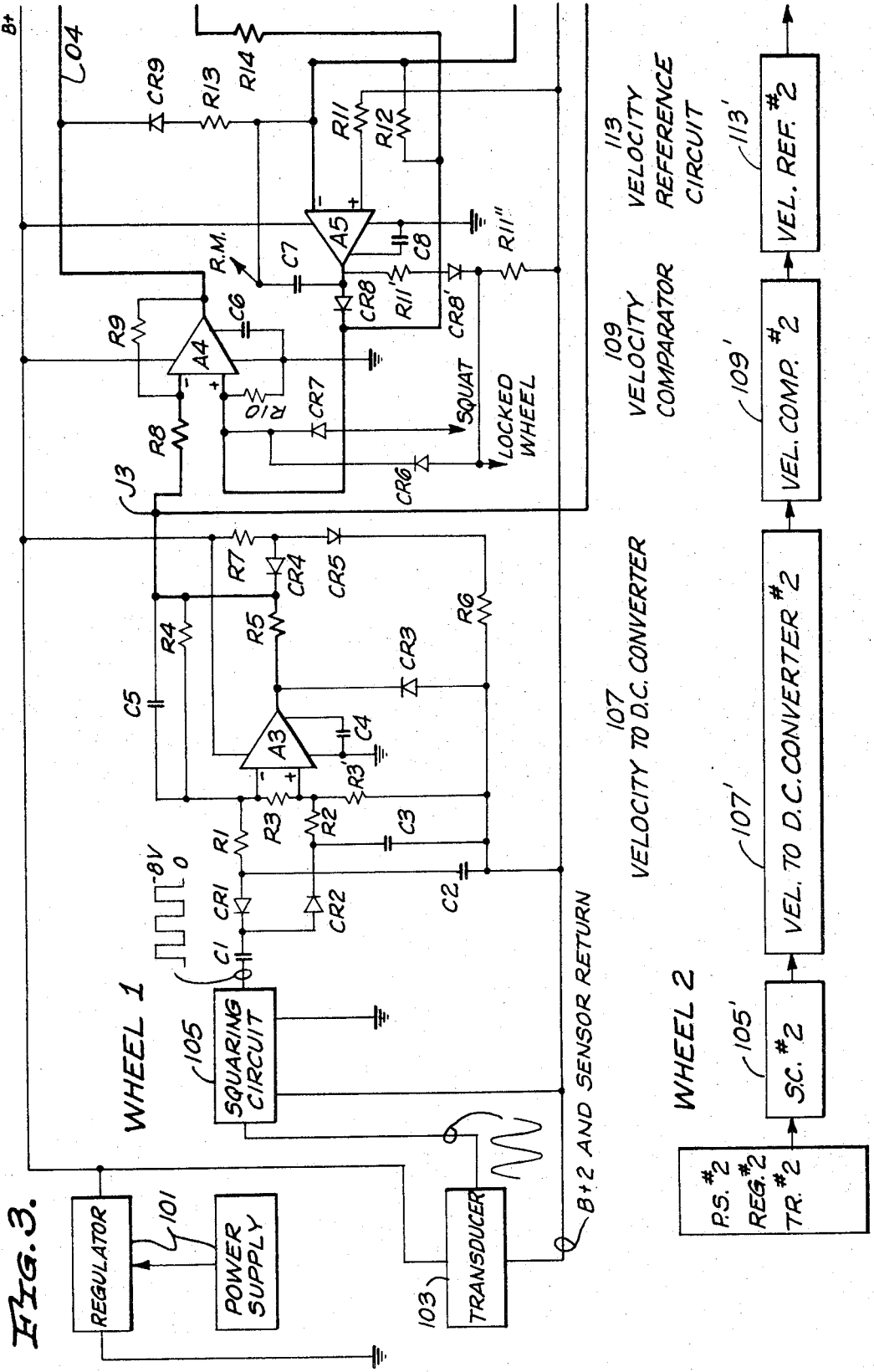

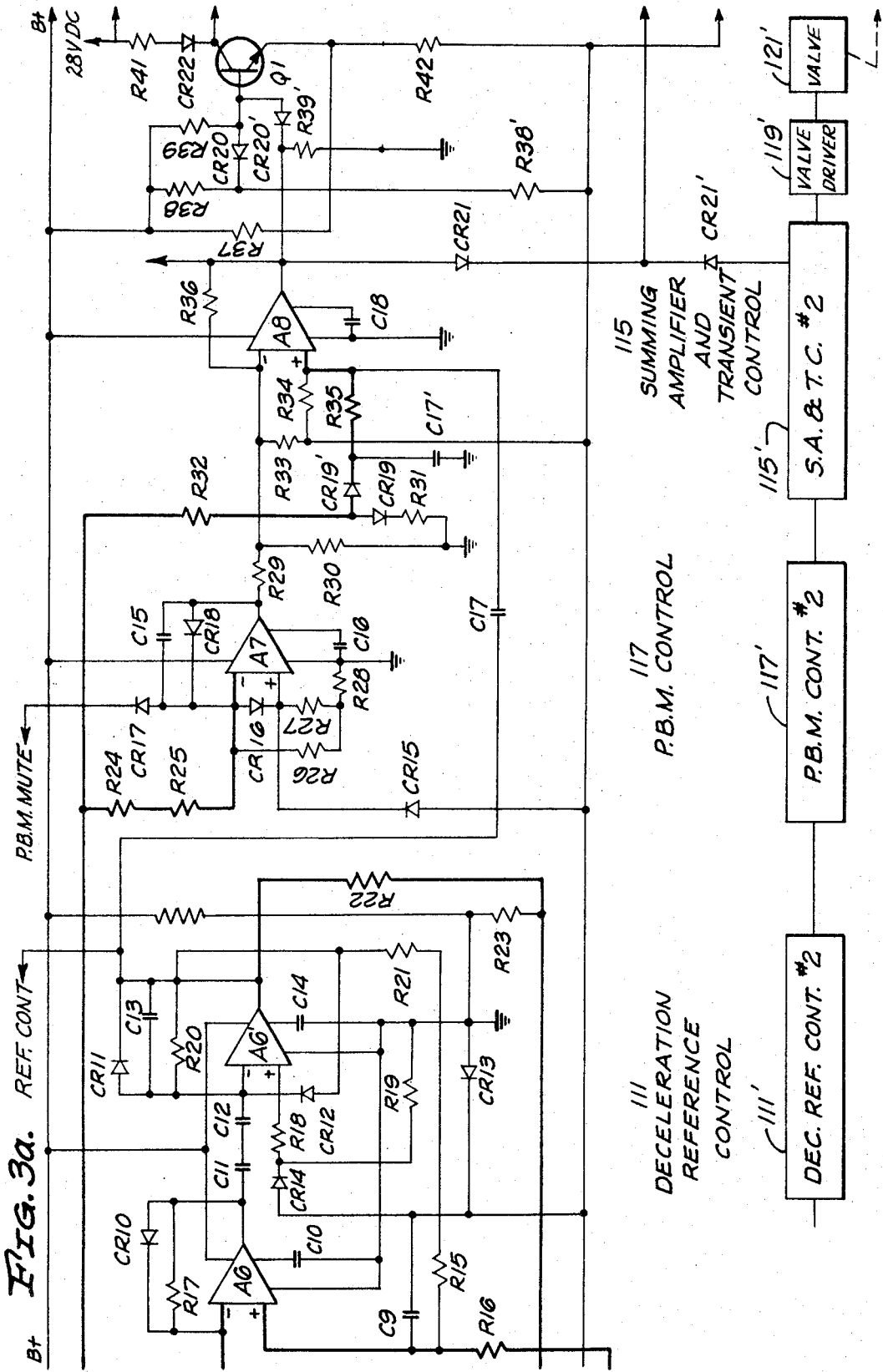

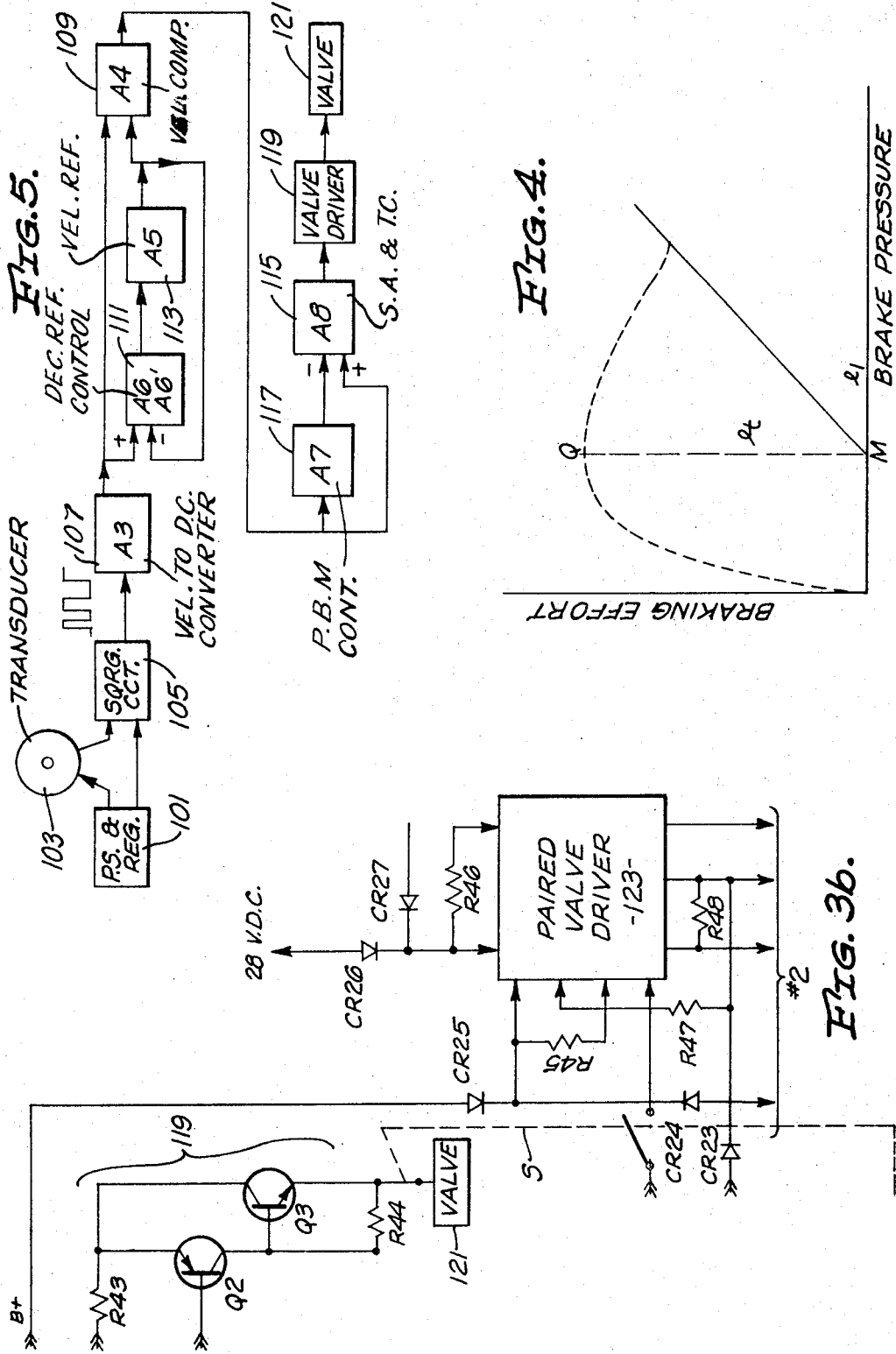

BRAKE CONTROL MODULATOR

This application is a division of my application for United States Letters Patent, Ser. No. 871,439, filed Oct. 22, 1969, now abandoned which in turn is a continuation-in-part of my application for United States Letters Patent, Ser. No. 665,072, filed Sept. 1, 1967, now abandoned entitled Braking Control System for Aircraft Vehicles and the Like.

This invention is directed to a multi-wheel brake control system suitable for use on a vehicle equipped with independently brakable wheels. Each wheel activates transducer and converter means for translating wheel rotational speed to electrical energy having an analog value proportional to wheel speed. The control system features means providing an electrical reference representative of and simulating the ground speed of the vehicle together with means for producing, relative to each wheel, an electrical value representing the instantaneous wheel speed and comparator means having a dual output for comparing this electrical value with the electrical reference simulating the vehicle ground speed. One of the dual outputs of the comparator means results from a minor error signal representative of incipient wheel skid and a small disparity between the compared electrical values and a first predetermined quantity, and is utilized to effect minor relaxation of braking on the associated wheel. The second output of the comparator means results from a gross error or an excess deceleration signal representative of gross disparity between the compared electrical values and a second predetermined quantity, and is utilized to further augment the brake relaxing action of the first one of the output signals, it being understood that the two output signal processing means operate in parallel independently of one another and additively. In this manner the invention system operates during deceleration to provide a reference signal simulating vehicle ground speed and including means for continuously generating at each braked wheel an analog signal representing instantaneous rotational speed and for comparing this signal with the vehicle speed reference. If the difference is small, relatively light brake relaxation occurs, but if the difference is large, substantially greater relaxation occurs. In addition, the system features means operating at times to provide full brake release until the wheels approach or resume a speed corresponding to the vehicle ground speed before permitting further braking.

A paired wheel crossover circuit interconnecting the brake controls of paired wheels located along the opposite sides of the vehicle is responsive to a gross disparity between the rotational speeds of the paired wheels to release braking of the slow wheel as well as to provide fail safe protection should the speed sensing circuit of either wheel fail. In this case, braking of the wheel having the unserviceable speed sensor is deactivated.

Another important feature is the provision of hydraulic lag compensation including separate means for compensating for the different lag values associated with brake release and with reapplication of braking. Each of these lag values is simulated and appropriate correction signals are combined with the braking signals associated with brake relaxation and with restoration of braking.

In the prior art, vehicle braking systems are known in which analog signals are generated which represent the rate of rotational deceleration of a wheel being braked, and in which a reference signal is produced which represents an experimentally determined maximum permissible rate of rotational deceleration of the wheel, the two signals being effectively placed in opposition whereby brake-controlling means, such as a valve, are quiescent or unenergized until such time as the reference signal is exceeded by the wheel deceleration signal, whereupon the brake is released in proportion to the signal differences. Other of these prior systems utilize means for draining or bleeding away the wheel-deceleration signal via drain means to correspond with the amount of the wheel-deceleration signal produced when wheel-skidding is substantially incipient. When the signal drainage capacity is exceeded, the excess signal value is used to initiate operation of brake-controlling means to reduce the braking effort.

The present system presents certain improvements over the prior art such as the provision of a continuously variable reference signal representing the immediately previous wheel speed as modified by a signal representing what the entire vehicle braking system is currently doing. The standard of reference is the potential of a charge stored in a capacitive device and representative of craft speed, the charge being caused to decrease in proportion to braking effectiveness. This stored charge is subject to variable drainage dependent upon the magnitude of brake-control signals furnished to the several brakes. The system utilizes the reference potential and an analog potential representing the instantaneous rotational speed of a wheel in comparator means operating to provide first and second output signals which are processed to provide separate brake-control signals if either output signal exceeds a respective threshold value. The first output signal is used to produce a relatively moderate brake relaxation signal provided by the effects of the first signal up to a selected level of relaxation. The second error signal, augmented by the first, is used to relax the brake further up to and including complete release of the brake of the associated wheel, depending upon the disparity between the wheel velocity analog signal representing the instantaneous rotational speed of the wheel and the instantaneous value of the variable reference analog signal representative of the craft ground speed.

It will therefore be understood that the present invention provides a comparator unit operable to provide separate minor and major error signals for each wheel to the end that these separate signals may be analyzed separately of one another and compared with respective threshold values of selected measure and then utilized alone and in combination to control braking action. Minor output signals, herein also termed PBM or pressure bias modulation signals, provide a primary control and establish a variable mean pressure level of braking pressure for normal braking conditions. The major or transient error signals are processed separately from the minor error signals and provide a major corrective signal to vary the mean braking pressure level in response to sudden large increases in wheel deceleration. Since these two error signals are processed in parallel circuits and separately from one another, each processing circuit can have its own threshold level, gain and limit values. For example, the PBM signal control can be set to respond to a limited range of small error signals whereas the transient signal control can be designed to be relatively insensitive until the error signals approach and exceed the end of the PBM control range. Under these circumstances, the transient control means generates a high-speed high-gain correction signal to reduce braking pressure sharply and, upon wheel spin-up, return control to the PBM control unit. This arrangement is found to provide smooth variation in the valve signal for normal braking operations and can be supplemented, on need, by a relatively large transient signal should the wheel encounter a wet spot, an ice patch or the like.

The present invention features a unique mode of establishing a reference potential representative of the actual rotational speed for each wheel. This reference potential is tailored to the size of the particular wheel and to the tolerances of the components used in its own speed sensing circuit. The reference potential for each wheel is established instantly upon initial wheel spin up and is re-established at new maximum but progressvely lower values each time the brake for that wheel is released and the wheel spins up. These maximum values may be the same or different from the corresponding reference potentials of the other wheels because of possible differences between the respective wheel diameters and tolerance variations in the components of the respective wheel speed sensing circuits. Each reference potential decays at a rate which corresponds to the maximum permissible vehicle deceleration rate under optimum runway braking conditions as modified by brake release signals from all wheels subject to brake control.

Another significant improvement in the present braking system arises from the fact that instantaneous wheel braking is modified in accordance with the performance of the braking system as a whole, that is, by a value representative of the instantaneous ground speed of the craft. This expedient makes possible the same control sensitivity under a wide range of runway conditions over the entire range of vehicle landing speed from touch-down to taxiing speed, a capability not achievable with prior anti-skid systems.

Under dry runway conditions, the craft is capable of decelerating at a high rate and with the relatively small PBM brake signals applied to the valve to relax braking pressure as needed. Under these conditions the potential representing craft velocity decays at a relatively high rate as the craft decelerates rapidly. Under wet, icy or low "mu" runway conditions the brake valves will operate at relatively high correction signals with the result that the craft speed reference potential is caused to decay at a slower rate. Thus the instantaneous wheel velocity is compared with a realistic aircraft velocity and an error signal of greater intensity is generated and utilized to provide an expedited valve control signal, as is desirable for wet or icy runway conditions.

Another feature of the present braking system is the fact that the transient control signal is added to or summed with the PBM control signal to provide expedited and greater brake relief when a wheel strikes a wet or icy spot, or a patch of smooth macadam. As soon as the wheel passes the low "mu" runway condition, the relatively severe transient error signal ceases and control is returned to the relatively smooth and even level error control provided by the PBM unit. It is therefore seen that the present system has a highly flexible and adaptive capability for providing highly efficient braking under wide range variable runway conditions.

An important safety feature of the invention is provided by a paired wheel crossover circuit coupling control circuits of two wheels at opposite sides of the vehicle together to safeguard against the possibility of either wheel operating with brakes applied when the associated wheel is locked or grossly over-braked. In addition the crossover circuit provides fail safe operation in the event the speed sensor circuit for either of paired wheels fails. In this case, the brake controlled by a nonfunctioning sensor circuit is rendered inoperative until the unserviceable circuit has been repaired.

Another novel feature of the invention concerns means for simulating fluid inertia or time response characteristics of the hydraulic braking system and operating to compensate for the delay in relaxing the brakes upon actuation of the control valve as well as for the delay in reapplying the brake when the valve is actuated in the opposite direction. It will therefore be understood that the signal to the antiskid control valve employed to govern the brake of each wheel is modified to compensate for fluid inertia factors associated with both brake release and reapplication of the brake.

Accordingly, it is a primary object of the present invention to provide an improved and more efficient braking control system featuring high sensitivity and more flexible responsiveness to ground conditions.

Another object of the invention is the provision of a braking control system for aircraft and vehicles generally utilizing means for producing signals representative of the changing ground speed of the craft and modifying the braking action on individual wheels in a degree dependent upon the difference between the craft speed signal and the instantaneous speed signal of each wheel.

Another object of the invention is the provision of a braking control system for vehicles featuring means for establishing separate deceleration reference signals for each wheel for comparison with a signal representative of the instantaneous rotational speed of the associated wheel and including means for modifying each reference signal by a correction factor produced by the brake control signals of the various wheels of the system.

Another object of the invention is the provision of a highly versatile, quickly responsive braking control system having two means for separately processing different types of instantaneous wheel speed error signals and utilizing the output of one processing means to provide a range of minor brake control signals and the output of the second means for providing a range of major brake control signals when more severe corrective action is needed.

Another object of the invention is the provision of a braking control system for vehicles having means for providing separate wheel speed deceleration signals and for separately processing signals relative to individual predetermined threshold values and for utilizing the resultant outputs to control wheel braking.

Another object of the invention is the provision of a braking control system for a vehicle having a plurality of wheels and utilizing brake control signals from all the wheels to provide a reference representing the ground speed of the vehicle for comparison with the instantaneous speed of individual wheels to provide means for braking individual wheels as necessary for maximum braking effectiveness under existing roadway conditions.

Another object of the invention is the provision of a braking control system for a plurality of vehicle wheels in which braking is modified by signals obtained through instantaneous comparison of a wheel speed analog signal with a variable analog signal representative of the contemporaneous ground speed of the vehicle.

Another object of the invention is the provision of a braking control system having improved means for assuming wheel spin-up before permitting application of the brakes.

Another object of the invention is the provision of a braking control system having means associated with pairs of wheels positioned one on either side of the craft and operating to sense wide scale disparities in their rotational speeds and responsive to such conditions to release the brake of the slow wheel pending spin-up.

Another object of the invention is the provision of a braking control system having means for normally controlling the brake for each wheel independently of one another and featuring fail-safe control means interconnecting the wheel circuits of each pair and operable to deactivate the wheel brakes of the inoperative wheel upon malfunctioning of speed sensor circuit.

Another object of the invention is the provision of a braking control system for a multiwheeled vehicle having the brake control means for wheels on opposite sides thereof interconnected with one another and effective, upon sensing a wheel speed disparity of predetermined magnitude, to release the brake for the slower wheel until the paired wheels are operating at generally similar speeds.

Another object of the invention is the provision of a braking control system utilizing hydraulic braking and featuring means for compensating for time required to drain fluid from brake components when relaxing the brake.

Another object of the invention is the provision of an anti-skid braking system utilizing hydraulic braking and featuring means for compensating for time required to restore hydraulic pressure in the braking components when reapplying the brake.

Another object of the invention is the provision of an anti-skid braking system having separate selectively operable hydraulic lag simulators for compensating for fluid flow delays in releasing and reapplying the brake in response to a skid signal.

Another object of the invention is to provide means for producing a signal representative of instant rotational speed of a wheel and means for deriving from the produced signal a second signal representative of ground velocity of the vehicle, whereby disparity between such produced and second signals representative of excessive rotational deceleration of the wheel relative to vehicle speed may be sensed and utilized to initiate relaxation of braking effort at the wheel.

These and other more specific objects will appear upon reading the following specification and claims and upon considering in connection therewith the attached drawings to which they relate.

Referring now to the drawings in which a preferred embodiment of the invention is illustrated.

Figure 2B:
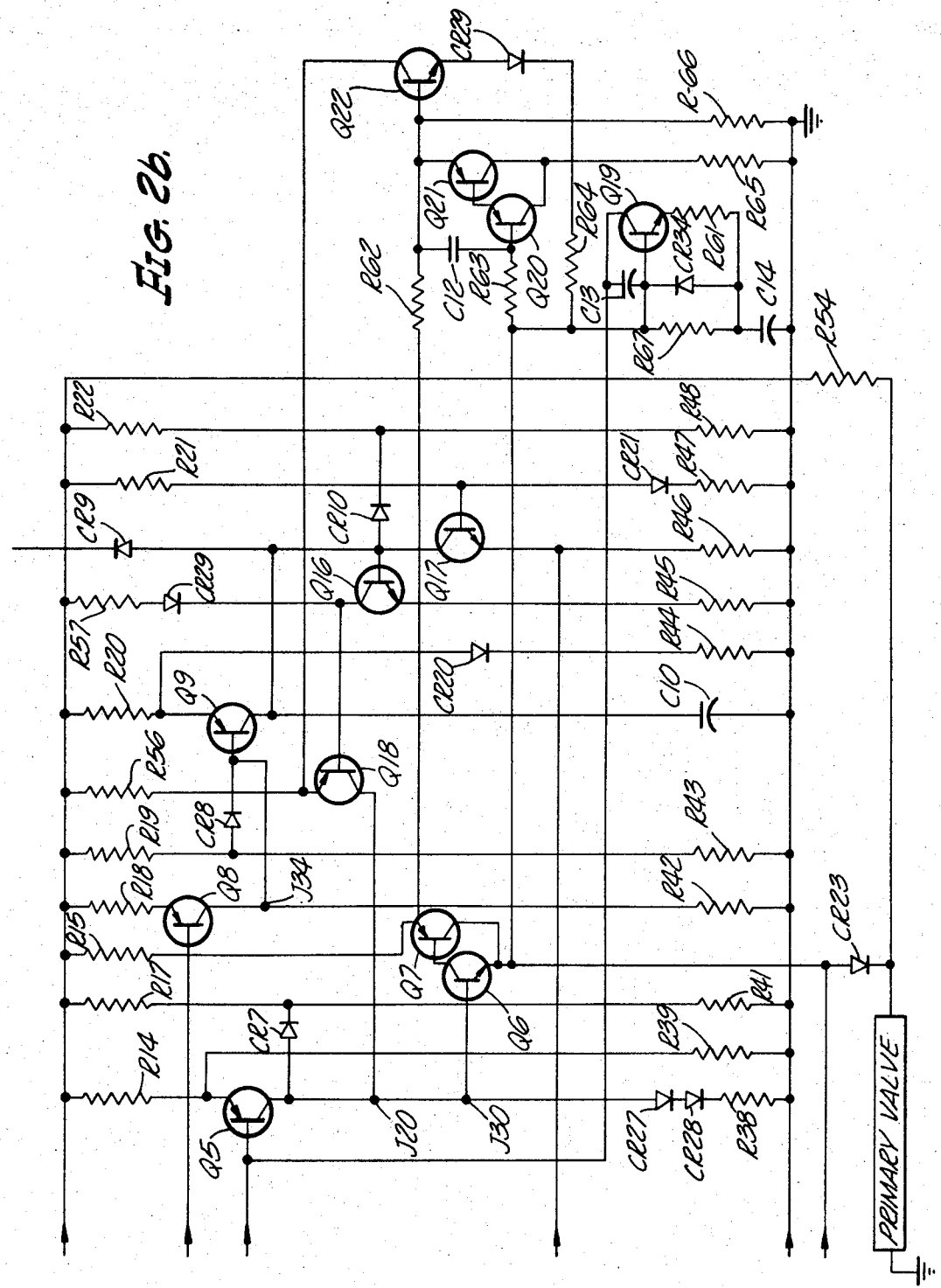

FIG. 1 is a schematic functional block diagram of the principal units of an illustrative embodiment of the invention;

FIGS. 2a and 2b taken together, comprise principally a schematic diagram of the electrical components for one wheel only of the several wheels being controlled;

FIGS. 3, 3a and 3b collectively depict in block and schematic diagram form the circuit details of a second exemplary embodiment of the invention in a system employing operational amplifier (op amp) means and comprising other circuit improvements for effecting improvements in functional operations of certain groups of the components of the system;

FIG. 4 is a graph useful in explaining optimization of braking action attained by the means illustrated in part in FIGS. 3, 3a and b; and FIG. 5 is a schematic block diagram useful in explaining functional units of the circuits depicted more in detail in FIGS. 3, 3a and 3b.

IN GENERAL

Referring to the drawings, there is shown an exemplary embodiment of the invention arranged for use with aircraft landing wheels, although it will be understood that the principles of the invention are applicable to means for braking vehicles generally. The showing in the drawings is directed more particularly to the components employed to control a single wheel and includes an indication of the necessary connections between the similarly connected control components associated with each of the other wheels. The invention system includes for each wheel a suitable a.c. signal transducer, such as a conventional a.c. generator, driven by the wheel to supply an a.c. signal the frequency of which is directed proportional to the rotational speed of the associated wheel. The brake for each wheel includes any suitable brake applying and releasing means well known in this art and preferably of the hydraulic type subject to control by the pilot or other operator and including an electrically actuated valve for releasing pressurized fluid to a fluid return line when the invention control system signals for brake relaxation. The a.c. wave produced by a wheel speed transducer is supplied to a squaring unit 10 to produce a substantially square-wave output signal having a frequency directly proportional to the rotational speed of the wheel driving the transducer. The square-wave output of unit 10 is fed to a frequency-to-d.c.-potential analog converter unit 20 which has two output signals each having a potential magnitude proportional to the frequency of the square wave input signal. Each comprises an instantaneous wheel speed signal in the form of an integrated variable potential, and one is supplied to comparator unit 30 and the other is supplied to reference signal unit 40.

Comparator 30 is effective to compare the primary input signal from unit 20 with a reference signal provided from reference signal unit 40 to be described presently. When any wheel is braked to decelerate in excess of a determined rate, due to excessive braking force or an insufficient ground coefficient, comparator unit 30 detects this condition by comparing the change in magnitude of the output signal from unit 20 with the magnitude of a varying reference potential produced by reference signal unit 40 and representative of the instantaneous ground speed of the craft. Comparator unit 30 has first and second output signal lines which may or may not carry an effective output signal depending on the natures of the input signals to unit 30. The first output signal line is connected to a PBM or small error control unit 50 and the other to a transient or gross error control unit 70.

If the input signal to PBM unit 50 is within preselected range of magnitudes above a determined threshold value representative of the need for minor braking corrections, an output signal of appropriate magnitude is channeled to driver unit 60 for the brake control valve. If there is a gross speed error signal in excess of a predetermined and separate threshold value, then transient control 70 provides an intense output signal to driver unit 60 augmenting the signal then being received from PBM unit 50 with the result that driver unit 60 provides a large brake relaxing signal until the associated wheel spins up to provide a nullifying signal. The extent of brake relaxation is proportional to the input signals received by driver unit 60 from units 50 and 70.

The output signal of driver unit 60 is also applied, in common with similar signals supplied by each of corresponding driver units associated with other of the vehicle wheels, to reference signal unit 40. Unit 40 is arranged to utilize input signals supplied, respectively, by converter unit 20 and a touchdown protection unit 90. The latter unit is effective to provide a full strength brake-release signal to control unit 80 until such time as the associated wheel is fully load bearing and rotating at full speed. Unit 90 is supplied electric power by an oleo switch which remains closed until the wheel becomes load-bearing. Other details of the exemplary system and its operation are described below.

THE SYSTEM DETAILS

Direct current power at 18 volts is supplied to the circuitry from a closely regulated power supply via the positively energized bus P and ground bus G. It will be understood that the various circuit components are interconnected as illustrated, and that R denotes resistor, C denotes capacitor, CR denotes diode rectifier, J denotes a junction, and Q denotes a transistor. Suitable exemplary values of the components are listed in Table I, below.

An a.c. wave signal from a wheel-actuated transducer is introduced to the circuit on line T and is translated in known manner into a square wave signal by unit 10 which includes a wave-shaping amplifier transistor Q10. The latter amplifies the low level a.c. input signal, and a Zener diode CR 13 clips the output of Q10 to form a square wave having a constant amplitude and the same frequency as the transducer signal. As is evident, the input a.c. wave signal is applied to the base of Q10 via resistor R4 and coupling capacitor C3 and the resulting square wave signal, generated across the circuit including resistor R25, appears at junction J1.

The square wave output signal of the squaring unit is translated by the network including capacitors C4 and C5, rectifiers CR14 and CR15, resistor R26 and the input portion of transistor Q11, into an analog d.c. signal having d.c. potential level proportional to wheel rotational speed. The d. c. signal, so produced and appearing across capacitor C5, is inverted and amplified by means comprising transistors Q11 and Q12, the amplification being at a fixed gain determined by the ratio of the values of resistors R27 and R26. The signal so produced appears at J9 and has an analog potential varying directly with rotational wheel speed. The circuit component values are so chosen that when the transducer input frequency is zero, Q11 is maintained in saturation by the normal current through R27 and the voltage developed across resistor R29. In this manner, the quiescent voltage developed across R29 establishes a low speed velocity threshold or drop-out point for the output signal from amplifier Q11–Q12.

The latter amplifier accordingly remains inactive until the wheel rotational speed provides a square wave signal producing a signal current through R26 equal to the saturation current directed through R27 by the threshold voltage apparent across R29. Accordingly, at low wheel speeds amplifier Q11–Q12 is inactive and, for reasons explained more fully presently, the wheel speed signal is incapable of interfering with manually controlled braking operations during taxiing and parking operations.

Comparator unit 30 comprises a differential amplifier circuit featuring amplifiers Q3 and Q4 the currents through which are restricted to a sum value held constant by constant current transistor Q14, the bias potential of which is fixed by resistors R35, R36 and R13 and rectifier CR18. The wheel speed analog potential apparent at junction J9 is imposed, via respective rectifiers CR3 and CR2, onto the base electrodes of each of amplifiers Q3 and Q4. This same wheel speed potential is also employed to charge the vehicle ground speed reference capacitor C8. Decay of the latter charge by discharge via Q15 and R37 is regulated at a rate representative of the desired instantaneous maximum permissible deceleration rate for the vehicle.

When the potential at J9 representing instantaneous rotational speed of the wheel decreases at a rate faster than the vehicle speed reference potential on C8, rectifier CR2 becomes back biased, Q4 remains biased by the potential of C8, and the bias of Q3 decreases with the decreasing wheel speed potential. This condition indicates the wheel is decelerating excessively and, in consequence, Q4 conducts increasingly, and Q3 conducts decreasingly, because Q14 operates to hold the sum of the currents through Q3 and Q4 constant. As a result of this differential action of Q3–Q4, a positive-going potential signal is created at junction J21 and concurrently a negative-going potential signal is created at junction J22.

Thus there is generated at J21 a PBM wheel velocity error signal when and only when the potential drop across R9, CR4 decreases to a value at which Q3 is biased toward the non-conductive state. Similarly, there is generated at J22 a transient wheel velocity error signal when and only when the potential drop across R12-CR5 increases to a value at which Q5 is biased to the conductive state.

The positive-going signal at J21 constitutes a first output signal of comparator unit 30 and this signal is applied to the base of transistor Q8 of the pressure bias modulated or "PBM" control unit 50. The negative-going signal appearing at J22 constitutes a second output signal herein called a "transient control signal," and this signal is applied to the base of transistor Q5 of transient control unit 70. The two noted signals, as heretofore indicated, may be appropriately designated error signals. If these signals are small, they indicate wheel deceleration at a rate moderately faster than the rate of deceleration of the craft itself as represented by the rate of discharge of the variable reference capacitor C8. A stable condition of the differential amplifier Q3-Q4 exists during wheel spin-up as the aircraft touches down and whenever the wheel speed corresponds with the ground speed of the craft less permissible creep. An unbalanced condition exists whenever the wheel is being braked so as to have a rotational speed less than that equivalent to ground speed of the craft minus the permissible non-skidding creep of the wheel tread relative to the track. This condition is evidenced by a smaller potential at J9 than on capacitor C8.

The circuitry of unit 40 comprises chiefly reference capacitor C8 transistor Q15 controlling the discharge of C8 and control feedback loops from the valve driver circuit of all wheels and which loops include a respective one of the resistors R50, R51, R52 and R53. For example, it will be understood that R53 is in the feedback loop connected to the output of the driver circuit for the particular wheel circuit shown in FIGS. 2a, 2b. Similar currents are supplied to J50 by similar connections to similar driver units associated with each of the other wheels. The currents thus supplied via R50, R52, and R53 to J50 are there added and flow to ground G via resistor R37, which is the same resistor through which reference capacitor C8 must discharge via transistor Q15.

It is, therefore, evident that the effective bias on Q15 and the decay rate permitted for C8 is dependent upon the summed currents through J50. As previously noted, the reference potential level at C8 relative to the potential at J9, determines the balance or degree of unbalance of differential amplifier Q3-Q4 and depends upon the rate at which C8 discharges. The instantaneous rate of decrease of the reference potential on C8 is thus determined by the contemporaneous rate at which C8 discharges through Q15. The rate control feed back via R50, 51, 52 and 53 will therefore be understood as effective to adjust the instantaneous Q15 collector current to discharge C8 at a rate closely simulating the contemporaneous instantaneous vehicle deceleration.

The current discharging from capacitor C8 via Q15 dictates the rate of charge of the reference potential of C8. Thus if the current is controlled by means of the circuit parameters of Q15 base and the current at J50 in a manner accurately representing vehicle deceleration, the rate of change of the reference velocity potential of C8 will be the same as the rate of change of air-craft velocity. Thus the wheel velocity signal will be compared to an accurate representation of the aircraft velocity as normalized for circuit component tolerances, tire diameter, etc.

An alternative method and means for providing a representation of the ground speed of the vehicle utilizes a free running wheel and generator means driven by the wheel and generating a current of intensity proportional to the rate of change of ground speed of the wheel, the generated current being applied to the discharge circuit for capacitor C8 provided by Q15 and R37. Still another mode of enabling C8 to function in providing a reference potential representative of the actual ground speed of the craft or vehicle at any time may comprise suitable transducer means, as for example a potentiometric accelerometer, operating to introduce a current flow into the discharge circuit for C8 representative of the rate of change of craft ground speed at any instant.

It will be understood that the bias network R16, CR19, R40 and emitter resistor R37 set the quiescent collector current for Q15 to allow the reference potential on C8 to decrease at a rate equivalent to the maximum permissible wheel deceleration rate for the particular vehicle. As is evident from the drawings, the rate control feedback loops provide feedback currents proportional to the brake control signals produced by the respective driver units, such as unit 60. The sum of these several feedback currents is a function of the total instantaneous change of braking effort from that required to produce maximum permissible deceleration under ideal conditions and therefore simulates the change of actual ground speed under existing runway conditions.

Returning now to the noted error signals created at J21 and J22 by the unbalance of Q3-Q4, it will be understood that both the PBM and the transient wheel speed error signals apparent respectively at Q8 and Q5 are proportional to the "velocity error," i.e., to the disparity between the reference signal at C8 and the velocity signal at J9. The transient or major error signal, applied to Q5 from J22, is amplified by Q5 and provides relativey large brake control signals. For Q5 to become active to initiate a brake controlling action, the error signal from J22 must be sufficient to overcome the departure threshold bias potential provided at the emitter of Q5 by the voltage divider comprising R14 and R39. When that occurs, Q5 produces an output signal at J30 which is applied to the unity-gain amplifier Q6-Q7 of driver unit 60. As will be made evident below, the output signal of Q5 is summed at J20, J30 with the output signal from PBM control unit 50 and these combined signals are utilized to relax the wheel brake.

The PBM control circuit unit 50, comprising transistor Q8, receives the positive-going minor error signal from comparator unit 30. This signal drives Q8 toward cutoff and, in doing 50, causes the voltage drop across R42 to fall, thereby bringing the potential at J34 more negative and causing Q9 to conduct as soon as the R42 voltage drop falls below a departure threshold level determined by the voltage division of R20, CR20 and R44. A voltage clamp provided by R19, R43 and CR8 clamps the voltage drop developed across R20, which in turn clamps the collector current of Q9 when the error signal reaches a predetermined upper level. When the voltage drop across R20 is intermediate the departure threshold level and the clamped potential level, the current conducted by Q9 is proportional to the magnitude of the error signal. The current passed by amplifier Q9 is integrated with respect to time by PBM capacitor C10.

As is made evident in FIG. 2b, Q17 is a constant-bias transistor operating to provide a constant current discharge path for capacitor C10. Thus Q17, in effect, provides a fixed negative going error voltage when it is integrated by C10 along with the positive going error signal from Q9 mentioned above. The resultant integrated error voltage across C10 is coupled to driver unit 60 by amplifiers Q16 and Q18, and is summed at J20–J30 with the transient error signal provided by Q5. The summed error signal, apparent at J30, is the input signal to the unity gain amplifier Q6–Q7 of driver unit 60.

The output of Q6–Q7 is connected to the valve via CR23 and operates brake control unit 80 to relax the brake. This output is also connected through R53 to junction J50 to contribute to the feedback controlling the craft speed reference voltage at C8.

Under resonably uniform runway conditions, there is a corresponding optimum deceleration for the vehicle and a corresponding braking effort. For any optimum deceleration the PBM reference capacitor C10 remains steady with the discharge rate via Q17, R46 equaling the charging rate via Q9, R20. Any deviation from this steady condition is the result of an increase or a decrease in the error signal. The error signal is the difference between the instantaneous wheel speed signal and the craft velocity reference signal. If the reference velocity deceleration is an accurate representation of the vehicle deceleration, then there is provided an accurate error signal for use in modifying the PBM signal and which in turn is an accurate measure of the required relaxation of braking effort. Since the optimum braking effort corresponds to an optimum deceleration of the vehicle, the PBM signal can be used to accurately control the deceleration reference velocity signal. In this manner there is provided a closed loop between comparator unit 30, PBM control unit 50, driver unit 60 and reference signal unit 40 establishing optimum operating error velocity for the wheel for optimum braking effort and optimum slip.

If braking pressure increases sufficiently to reach or pass the optimum slip point, the associated error voltage integrated at C10 rises. That voltage acting through Q16-Q18 on driver unit 60 prolongs brake relaxation until equilibrium is attained. Under equilibrium conditions, the error signal current from the collector of Q9 equals the constant current drain of Q17, C10 ceases to charge, and the wheel slip is maintained at optimum level for maximum effective braking.

Any change in the wheel runway conditions from those representing optimum braking conditions decreases the slip from the optimum value, and a corresponding change occurs in the integrated error voltage across C10 until the resulting brake-control signal restores the slip to its optimum value. Hence, for small variations in wheel-track coefficient encountered during intensive braking, the brake-control signal will seek a constant level at or near the optimum level for most effective braking. However, when large-scale differences in wheel-track coefficient are encountered, as on a runway having spots of ice, the transient error signal is likely to predominate and brake control is derived largely via transient control amplifier Q5 to relieve braking fast and to a greater extent.

It will be understood that among the functions of certain components, not fully described above, are the following additional functions. Thus, diodes CR27 and CR28 in the circuit containing junctions J20, J30, at which the PBM and transient control signals are summed, provide temperature compensation for the base-emitter voltage drop of Q6 and coupling diodes CR22, CR23, R17, R41 and CR7 provide a voltage clamp to limit the maximum excursion of the brake control signal voltage to prevent overdrive of the brake relaxing control. It is also pointed out that diode CR7 is normally reversely biased until the base potential at Q6 reaches a maximum value at which diode CR7 becomes forward biased and limits excessive increase of the brake control signal.

BRAKE LOCKOUT DURING TOUCHDOWN

Positive means for assuring lockout of the braking during aircraft touchdown on a runway is assured by the invention antiskid control by means of the circuit including R49, CR16, Q13, R33, R34 and CR17 operating in conjunction with differential amplifier Q3–Q4. The function of this circuit is to assure complete brake release prior to touchdown of the craft on the runway and spin-up of the wheels. For this purpose there is provided a "squat" signal, this signal being supplied via a "squat" switch closed so long as the aircraft is airborne, and opening as the craft touches down on the runway.

A strong squat signal current is supplied through the squat switch from a 28-volt supply and through R49 and flows in part through R33, R34 to ground. The signal thus produced at J48 is supplied directly to C9 to charge this capacitor, and via CR17 to capacitor C8 and the base of differential amplifier Q4. The strong signal applied to Q4 provides a strong continuous error signal at J22 which, via transistor Q5, and driver Q6, Q7, produces a very strong brake signal to fully release the brakes.

Following spin-up, the voltage drop across R30, R31 increases due to the generation of a wheel signal. The resultant potential at R30, R31 causes Q13 to conduct, thereby causing C9 to discharge via R33, Q13 and R32 and via a parallel path through R34. This also removes the source of charge on C8 and the base of Q4 except as provided later via J9 by the spin-up of the wheel. Thus, C9 quickly discharges causing Q17 to conduct heavily thereby insuring the discharge of C10 and reducing the PBM to zero.

Incident to landing, the squat switch opens, thereby removing the source of potential at J44 and J48 and returning full control to the potential at C8 as determined by J9.

As is evident, prior to touchdown the brakes are held fully relaxed and the PBM potential stored in C10 is at a maximum. As wheel spin-up occurs, this charge is dissipated through Q17 via C9 in the manner just described, allowing the brake control signal to decrease to zero allowing the brake to apply rapidly but smoothly.

The crossover circuit includes CR10 and R5 of each wheel circuit. These series connected components are connected between the junction of the base of Q4 and reference capacitor C8 capacitor C8 one wheel control circuit, and the junction of R29, R30 of the other wheel control circuit in the manner indicated in FIG. 2a. So long as both of the paired wheels are being braked normally, the rotational speed potentials are closely related and CR10 of each crossover circuit is back biased by the wheel speed signal of the respective wheel circuits thereby decoupling the paired wheel speed potentials of each wheel from the differential amplifiers Q3-Q4 of the other wheel. However, should the relative speeds of the paired wheels differ by a preselected value, as 60 knots, the voltage drop across R30–R31 of the wheel whose circuit is normal or which is at the higher velocity remains at a level substantially above the potential at J9 of the non-functioning or lower velocity wheel circuit. The resultant potential supplied by the properly functioning circuit will therefore cause CR10 of the non-functioning or low velocity speed sensing circuit to conduct, supplying a potential at the base of Q4 much higher than the potential at the base of Q3. As a result the non-functioning circuit will exhibit a large unbalance in the comparator amplifier and signals will be generated to release the brake until such time as the circuit regains a potential at J9 corresponding to normal wheel velocity. During this interval the properly functioning circuit operates in a normal manner.

It will therefore be apparent that the paired wheel crossover circuit serves additionally as a fail-safe control to insure the brake release should the wheel speed signal producing circuit fail either prior to or during a braking run. In the event of such failure, the speed representative potential at J9 of the nonfunctioning speed potential generating circuit disappears and CR10 for that wheel becomes forward biased from the properly functioning speed signal generating circuit. The differential amplifier circuits corresponding to the failed signal generating circuit then becomes strongly unbalanced and provide full brake relaxing signals by way of the respective amplifiers. The strong brake releasing signal for the wheel circuit of the wheel whose wheel speed signal generating circuit is defective is supplied from reference capacitor C8 of that wheel circuit. Provision is thereby made for preventing braking of a wheel of a pair when either its speed sensing circuit fails to provide a wheel speed signal or its wheel locks up.

COMPENSATION FOR HYDRAULIC SYSTEM INERTIA

High speed and accurate control of maximum effective braking under wide-range roadway conditions using hydraulically actuated brakes necessitates provision for anticipating and compensating for factors of hydraulic lag. Thus there is a time lag between a signal calling for a change in the braking fluid pressure and the time the desired change in braking becomes effective, and irrespective of whether the change involves an increase or a decrease in the fluid pressure. However, the two types of lag are substantially different in magnitude, that accompanying brake release being much less than that associated with reapplication of braking.

To provide compensation for the foregoing, the invention system provides a hydraulic lead simulator comprising capacitors C13, C14, transistor Q19, diode CR34 and resistors R61, R67. This circuit receives its signal input potential from the valve driver circuit at the emitter of Q6. This signal is applied to the base of Q19 and, if sufficiently high, renders Q19 conductive to provide a rate current flow to charge capacitors C14. This rate current flow increases the potential drop across R12–CR5 to provide a signal which is summed at the base of Q5 with initial control signal from the differential amplifier to increase conduction through Q5 to cause Q6–Q7 to produce an initial augmented brake relaxing valve signal. This increased valve signal expedites operation of the valve to relax brake application and thereby increases the speed of brake relaxation. As C14 charges, the current rate through Q19 decreases and reduces the valve signal toward that actually called for by the differential amplifier.

The operation of the braking pressure recovery acceleratior or augmentor is more complex. This accelerator as herein disclosed by way of example consists basically of transistors Q20, Q21, Q22, resistors R62, R63, R64, capacitor C12 and diode CR29 and functions to provide a pressure boost signal of a nature causing the fluid pressure to rise in anticipation of further decrease of the valve signal during recovery from low braking pressure. To this end the recovery simulator functions to effect expedited closure of the valve during wheel spin-up thereby causing the brake cylinders to refill more quickly and thereby reestablish braking pressure at an accelerated pace. The increased fluid pressure is sensed across valve driver transistor Q7 by an increase of potential thereacross.

In operation, as the valve signal rises toward full brake release value, the voltage differential between the emitter-collector of Q7 and representative of brake fluid pressure, decreases substantially to zero. This differential drop causes Q21, Q22 to cease conducting and C12 to discharge through R62, Q7 and R63, thereby simulating fluid dumping from the brake. While this is occurring it will be understood Q22 is non-conducting.

If the valve signal then decreases to initiate valve recovery and reapplication of the brake, the collector-emittervoltage differential across Q7 increases and C12 charges through R62, R63 and simulates commencement of restoration of the fluid volume and pressure in the brake components. During this period Q20 and Q21 remain cutoff until C12 is partially recharged, but amplifier Q22 becomes conductive during the recharging period and produces a current flow through R64 and R65. The increasing voltage drop across R56 generates a simulated hydraulic error or lag compensating signal, by reducing the emitter potential on Q18 thereby reducing the signal to valve-driver Q6–Q7, and hastening cut-off of the driver and closure of the valve and reapplication of the brake.

As C12 becomes fully charged to simulate completion of the recovery cycle and full volume in the brake actuator, Q20 and Q21 become conductive and the voltage drop across R63 falls to zero causing Q22 to cease conducting. There is then no longer a drain from Q18 emitter and brake reapplication proceeds normally as the brake relaxation signal decays to zero. At this time the hydraulic recovery simulator again functions in the manner just described to compensate for lag in restoring fluid pressure and volume.

It will be understood that the above described hydraulic lag or inertia compensating means are desirable optional auxiliaries enhancing the performance of the principal system, but are not necessary to the operability of the principal system.

Exemplary values of the circuit components shown in FIGS. 2a and 2b are as follows:

TABLE I

| | | | | | |
|---|---|---|---|---|---|
| R4 | 470 ohms | R34 | 9.1 K | | |
| R5 | 5.1 K | R35 | 2.10K | | |
| R7 | 1 K | R36 | 2.10K | | |
| R8 | 6.8 K | R37 | 7.5 K | | |
| R9 | 15 K | R38 | 36 K | | |
| R10 | 1.82K | R39 | 60.4 K | | |
| R11 | 1.82K | R40 | 6.2 K | | |
| R12 | 15 K | R41 | 3 K | | |
| R13 | 34.8 K | R42 | 64.9 K | | |
| R14 | 15 K | R43 | 2 K | | |
| R15 | 200 ohms | R44 | 28 K | | |
| R16 | 150 K | R45 | 36 K | | |
| R17 | 3.3 K | R46 | 110 K | | |
| R18 | 15 K | R47 | 10 K | | |
| R19 | 1.5 K | R48 | 15 K | | |
| R20 | 15 K | R49 | 3 K | | |
| R21 | 150 K | R50 | 430 K | | |
| R22 | 2 K | R51 | 430 K | | |
| R23 | 1.8 K | R52 | 430 K | | |
| R24 | 47 K | R53 | 430 K | | |
| R25 | 2.2 K | R54 | 6.8 K | | |
| R26 | 4.3 K | R55 | 1.3 K | | |
| R27 | 43.2 K | R56 | 15 K | | |
| R28 | 130 ohms | R57 | 15 K | | |
| R29 | 43.2 ohms | R58 | 51 ohms | | |
| R30 | 4.3 K | R59 | 20 K | | |
| R31 | 4.3 K | R60 | 47 K | | |
| R32 | 56 ohms | R61 | 47 K | | |
| R33 | 15 K | R62 | 1.3 K | | |
| R63 | 36 K | Q12 | 2N3134 | CR30 | IN645 |
| R64 | 82 K | Q13 | 2N1711 | CR32 | IN645 |
| R65 | 51 ohms | Q14 | 2N1711 | CR33 | G130 |
| R66 | 20 K | Q15 | 2N1711 | CR34 | IN645 |
| R67 | 47 K | Q16 | 2N2605 | CR35 | IN645 |
| | | Q17 | 2N1711 | CR49 | IN963B |
| C2 | .47mfd | Q18 | 2N2605 | | |
| C3 | 5 mfd | Q19 | 2N1711 | | |
| C4 | .021mfd | Q20 | 2N3134 | | |
| C5 | 2.7 mfd | Q21 | 2N3134 | | |
| C6 | .22mfd | Q22 | 2N1711 | | |
| C7 | 22 mfd | | | | |
| C8 | 100 mfd | | | | |
| C9 | 22 mfd | CR8 | C130 | | |
| C10 | 10 mfd | CR9 | G130 | | |
| C11 | .1 mfd | CR10 | IN645 | | |
| C12 | 47 mfd | CR11 | IN645 | | |
| C13 | .015mfd | CR12 | IN645 | | |
| C14 | 2.2 mfd | CR13 | IN645 | | |
| | | CR14 | IN645 | | |
| Q1 | 2 N3134 | CR15 | IN645 | | |
| Q2 | 2N1711 | CR16 | IN963B | | |
| Q3 | 2N1711 | CR17 | IN645 | | |
| Q4 | 2N1711 | CR18 | G130 | | |
| Q5 | 2N2605 | CR19 | G130 | | |
| Q6 | 2N1711 | CR20 | IN645 | | |
| Q7 | 2N3134 | CR21 | IN961 | | |
| Q8 | 2N2605 | CR23 | IN965B | | |
| Q9 | 2N2605 | CR27 | IN645 | | |
| Q10 | 2N1711 | CR28 | G130 | | |
| Q11 | 2N1711 | CR29 | IN645 | | |

SECOND PREFERRED EMBODIMENT

In FIGS. 3, 3a and 3b is depicted in schematic diagram form a modified circuit arrangement according to the invention. Therein the power supply unit, the regulator unit, the transducer unit and the squaring circuit unit of the circuitry may be conventional and similar to like units of the previously described circuitry, and are accordingly shown in block-diagram form. The transducer unit produces an electric wave output whose frequency is proportional to the associated wheel.

In FIGS. 3, 3a and 3b, the circuitry for and associated with one wheel is shown in detail, while that for the opposite wheel of a pair is, for convenience and brevity, shown in block diagram form. The purpose and object of the modified circuit arrangement is to optimize to the maximum extent possible the braking effectiveness of the system. While the circuitry is, for reason of brevity, here restricted to that for two wheels, one at either side of the vehicle, it is evident that the system is equally applicable to additional pairs of wheels.

As in usual braking systems, braking effort as evidenced by retardation of the vehicle is increased with increasing application of brake pressure until a point is reached at which further application of pressure causes excessive slip of the wheel tire tread relative to the surface of the pavement, and the braking effort then decreases from a maximum value which is attained at the optimum tire slip point. Referring to FIG. 4, the graph shows variation of braking effort as brake pressure is increased. The curve is that resulting from plotting braking effort as ordinates and brake pressure as abscissae. A maximum is reached at point Q. The scale is arbitrary, and depends, inter alia, upon coefficient of friction, vehicle mass, and other variables. The maximum, at Q, defines the optimum tire slip point.

In accord with the principles of the invention as exemplified in the system herein disclosed, optimum braking is attained by application of increasing brake pressure to a value M corresponding to that for point Q in FIG. 4, and at that point seeking to change the applied brake pressure as may be required to maintain braking effort at that point. It will be understood that the shape of the curve varies as the nature of the pavement surface varies, and hence the location of point Q shifts both as to ordinate and as to abscissa. Thus, in a hydraulic system, if the braking pressure has been increased to a value at which braking slip increases beyond the optimum tire slip point value, the present system operates to reduce the applied pressure, and conversely, when the slip decreases below the optimum tire slip point value, the system acts to increase the applied pressure. Thus the system first seeks the maximum permissible brake pressure and braking effort, and then adjusts the pressure to maintain braking effort at the optimum tire slip point.

The first of the two actions noted, that is, seeking the maximum permissible pressure, is accomplished by the pressure bias modulation or PBM portion of the circuitry. That circuit action may be represented by the equation:

$$e_v = K \int (e_1 - e_t) \, dt \qquad (1)$$

where $e_1$ is herein termed the control circuit velocity error signal, $e_t$ is a fixed threshold signal level, $e_v$ is the value of the voltage applied to the valve coil, and $K$ is a constant.

From equation I it is evident that the valve signal will increase when $e_1 - e_t$ is greater than zero, and the rate of the increase is proportional to the magnitude of the difference. Conversely, the valve signal will decrease, and thereby permit the brake pressure to increase, when $e_1 - e_t$ is less than zero, and again the rate of increase of pressure is proportional to the magnitude of the indicated difference. It is also evident that when $e_1 - e_t$ the valve voltage or signal will be constant and will neither rise nor fall, and the brake pressure will be constant.

The parameters of $e_1$ and $e_t$ are indicated in FIG. 4. The following equation identifies the relation between measured aircraft velocity $v_a$, measured wheel velocity $v_w$, and $e_1$, viz:

$$e_1 = K(v_a - v_w) \quad \text{(II)}$$

noting that $e_1$ is a measure of the slip velocity. Any time the slip error exceeds $e_t$, the signal to the integrating section of the circuit is positive and, when integrated, causes reduction of the applied brake pressure by initiating valve action. Conversely, any time the slip error is less than $e_t$ the error signal is negative and permits the applied pressure to increase under the action of the brake pedal.

Thus it is evident that if $e_t$ is made to always correspond to the peak of the applied force/braking effort curve shown in FIG. 4, and $e_1$ is in fact true slip between tire and pavement, then the system will reduce applied pressure whenever the slip exceeds the peak value indicated at point Q, thereby reducing the brake torque and allowing the wheel to accelerate and the slip value to increase back to the peak value where the applied pressure becomes steady. If as a result of the pressure reduction the brake torque is reduced excessively, the slip will again be less than optimum, with a value somewhere along the left limb of the graph curve, the wheel speed or velocity error signal to the integrator will be negative, and braking pressure will again be allowed to increase with resultant increase of slip to the maximum value at $e_t$.

The preceding operations are based upon the assumption that $e_t$ is such as to coincide with the ordinate through the maximum braking effort or optimum slip point Q. The circuitry permits $e_t$ to adjust to the value corresponding to that ordinate.

Considering equation II, it is noted that even if the actual aircraft velocity, $v_w$, were known, at that value the threshold $e_t$ should be set to result in optimum slip would still be not known. The peak of the curve could be at $(v_a - v_w) = 6$ feet per second, or 8 feet per second, or other value. A set value for $e_t$ could be chosen and some measure of braking efficiency attained if the measured values of aircraft and wheel velocities $v_a$ and $v_w$ were used, but the efficiency would be conjectural and indeterminate. And although it is possible to measure velocity of a wheel, as distinguished from rotational speed, it is not feasible to measure two wheels, one braked and one not braked, with sufficient accuracy to determine the slip velocity with the desired precision.

Considering again FIG. 4, although the actual location of point Q, that is, the peak of the curve, is not known, it is nevertheless evident that the vehicle deceleration will be a maximum when the optimum wheel slip is at the peak value. Hence, if the rate of vehicle deceleration is known, and is brought to a maximum, the peak value of braking effort has been attained. Considering the equations of motion applicable to the wheel and the vehicle, the following are set down:

$$m(dv_1/dt) = F_b + F_g = F_d' \quad \text{(III)}$$

and $M(dv_2/dt) = F_g - F_d \quad \text{(IV)}$, wherein:

$m$ = mass equivalent of the wheel $M$ = mass of the vehicle
$F_b$ = brake equivalent force
$F_g$ = horizontal ground reaction force $F_d$ = summation of the other drag forces on vehicle
$v_1$ = wheel velocity
$v_2$ = vehicle velocity $F_d'$ = component of $Fd$ acting on the wheel
If, then, by choice, $F_b = 0, F_g = 0$,
$F_d' = m F_d/M$,
then $$m(dv_1/dt) = -F_b + F_g - F_d m/M \quad \text{(V)}$$

$$M(dv_2/dt) = -F_g - F_d \quad \text{(VI)}$$

Considering the case wherein braking effort $F_b$ is such as to maintain the tire so that the ground reaction force is a maximum, which is not the case when $F_b = F_{gp}$ where $F_{gp}$ is the maximum value of $F_g$, it is noted that:
$dv_2/dt = -F_{gp}/M = F_d/M$
But $dv_1/dt = dv_2/dt$ since the tire and the vehicle decelerate
at the same rate. Hence, from (V) and (VI):
$(-F_{gp}/M) - (F_d/M) = (F_b/m) + (F_{gp}/m) - (F_d/M)$,
or
$(-F_{gp}/M) - (F_d/M) = (-F_b/m) + (F_{gp}m) - (F_d/M)$,
and
$(-F_{gp}/M) = (-F_b/m) + (F_{gp}/m)$, or
$F_{gp}(1/M + 1/m) = F_b/m$ and $$F_b = (M+m)/(M) F_{gp} \quad \text{(VII)}$$

Equation (VII) shows that the brake force $F_b$ must be slightly greater than $F_g m$ for attainment of optimum deceleration of the vehicle. Note however that the unbalance force due to braking of the wheel is $-F_b + F_g$, so the magnitude of unbalance force that must be controlled by the control system is $F_u b = F_b + F_g$ where $F_u b$ is the braking unbalance force. Hence at the mentioned peak, $F_u b = -(M+m)/(m F_{gp}) + F_{gp}$
$= (M+m)/(1-m) F_{gp}$
$= m/M F_{gp}$ Hence, the unbalance force which must be controlled by the control system is equal to the ground reaction force multiplied by the ratio of the mass equivalent of the wheel to the mass of the vehicle. For typical aircraft the masses and the relation to the ground reaction force $F_g$ are as follows:

| Aircraft Type | Aircraft Mass | Wheel Mass | % $F_g$ |
|---|---|---|---|
| 16 wheels | 21200 slugs | 6 slugs | 0.03 |
| 8 wheels | 7300 slugs | 6 slugs | 0.08 |
| 4 wheels | 3000 slugs | 6 slugs | 0.2 |

Thus it is evident that the control circuit must effect extremely precise control to hold the braking at the optimum wheel slip value at the peak of the curve (FIG. 4).

The actual wheel velocity cannot conveniently be accurately measured, and hence the relative slip between the tire and the pavement cannot be accurately computed. However, referring to equations (III) and (IV), supra, it is noted that the derivative of the vehicle velocity is related to the wheel velocity as indicated in the following equations, in which $v_s$ = slip velocity:
$dv_2/dt - dv_1/dt = dv_s/dt$, and
$(dv_2/dt) - (dv_1/dt) + dv_1/dt = dv_2/dt$, and
$dv_s/dt + dv_1/dt = dv_2/dt$ Hence, if the slip velocity is known and differentiated and summed with the derivative of the wheel velocity, the result is the rate of change of velocity of the vehicle.

The circuitry depicted in schematic form and hereinafter described in some detail measures wheel velocity. Prior to application of brakes, the maximum value of wheel velocity is also the vehicle velocity. That initial value of aircraft velocity is used to measure instantaneous slip velocity, that is, the difference between vehicle velocity and wheel velocity. As is dictated by the foregoing analysis, the derivative of the slip velocity signal is determined, and added to the derivative of the wheel velocity signal to give a signal representative of the rate of change of vehicle velocity, which latter signal is used to modify the computed vehicle velocity signal. The latter modified vehicle velocity signal is at any instant the "reference velocity" signal in the circuit, from which signal the slip velocity may be continuously computed.

The depicted circuitry requires that the reference velocity decelerate or decrease at the maximum rate allowable for the runway pavement bearing the vehicle. Hence an error between the reference velocity and the measured wheel velocity will occur only when the wheel decelerates more rapidly than the vehicle. Thus an error signal is produced by the circuitry only when maximum deceleration occurs, and hence an error is measured only when the system is braking the wheel at the optimum slip value, that is when the operation is at the peak of the braking effort versus slip curve.

From the foregoing it will be recognized that if the wheel velocity signal and the reference signal are coincident, there is no error signal, and therefore the brake unbalance forces on the wheel are at zero value. The wheel is then decelerating only as a result of drag forces at other wheels and/or aerodynamic drag and thrust reverse forces. Referring to FIG. 4, the lack of an error signal will result in decrease of brake valve signal and consequent increase of braking pressure and braking effort. That increases deceleration of the wheel, and as wheel deceleration rises above vehicle deceleration the error signal increases and the rate of increase of brake pressure is reduced. Thus the system continuously seeks to keep the braking effort at the peak of the cruve and to maintain vehicle deceleration at maximum value. The slip velocity threshold $e_t$ in FIG. 4, is incorporated in the system to demand an error signal such that the control loop continuously seeks the maximum braking effort.

The modified system depicted in FIGS. 3, 3a and 3b is shown in more abbreviated form as a functional block diagram in FIG. 5. The power supply and regulator unit 101 supplies closely regulated d.c. power of, for example +15 volts and +4 volts to the B+ lead and to the transducer and B+2 and sensorreturn leads as shown in FIG. 3. The transducer 103 at, for example, wheel 1 produces an output wave signal as indicated in FIG. 3 which signal is shaped and limited by the wave squaring circuit 105 into a square wave the frequency of which is proportional to the rotational speed of the wheel. The constant-amplitude square wave output of the squaring circuit is transmitted to the velocity-to-d.c.-converter 107 whose function is to convert the variable-frequency square wave received from circuit 105 into a d.c. voltage signal whose amplitude is proportional to the frequency of the square wave and hence to the rotational speed of the wheel.

The d.c. signal produced by converter 107 is transmitted to each of units 109 and 111. The latter unit, comprising operational amplifier, hereinafter designated op-amp, units A6 and A6' of the circuitry in FIG. 3, functions to determine the rate of change of reference velocity based upon wheel velocity change and mass-ratio of the vehicle to wheel. It acts to differentiate the low-frequency component of the incoming signal to provide a measure of rate of change of velocity. The output signal from unit 111 is transmitted to velocity reference signal unit 113 which establishes a measure of instant vehicle velocity from the initial velocity and the instant signal from unit 111. The initial velocity is that represented by the signal immediately prior to braking.

The output signal from unit 113, representative of instant vehicle velocity is fed back to unit 111 as indicated by the heavy line from the output of op amp A5 to the input of op amp A6 in FIGS. 3 and 3a; and is also supplied to the velocity comparator unit 109. Unit 109 functions to compare the wheel velocity as represented by the wheel speed signal produced by unit 107, with the simulated vehicle velocity represented by the output signal of unit 113, and to produce an output signal which is the previously mentioned velocity error voltage or signal.

The latter signal is supplied to the op amp A8 of FIG. 3a by way of the heavy line signal path joining the output of op amp A4 (FIG. 3) and the positive signal input terminal of A8. Op amp A8 is comprised in the aforementioned summing circuit which is included in the summing amplifier and transient control unit 115. The velocity error signal is also transmitted to op amp A7 (FIG. 3) of the PBM control circuit comprised in PBM control unit 117. The latter unit integrates error signal up to a limiting level, to provide pulse bias modulation control voltage signal effective to accommodate mild error signal levels to provide moderate braking correction. The output of unit 117 is applied to the negative signal input terminal of op amp A8 of the summing amplifier.

The summing amplifier and transient control unit 115 provides an output signal that is transmitted to the valve driver amplifier unit 119 which comprises transistors Q1, Q2 and Q3 (FIGS. 3a and 3b). As will be explained in connection with the description of the circuitry depicted, unit 119 provides current to the coil of the servo valve unit 121 in inverse proportion to the required brake pressure reduction. Thus the greater the current supplied, the more brake pressure is relieved or relaxed.

The two wheels of a pair, here denoted wheel 1 and wheel 2, and each of which is on a side of the vehicle opposite the other, are provided with substantially identical circuits, that for wheel 2 being condensed in FIGS. 3, 3a and 3b to block diagram form except as is hereinafter noted. Description of details will thus largely be restricted to the circuitry associated with wheel 1 only.

Referring now to the detailed circuitry schematically portrayed in FIGS. 3, 3a and 3b, the units denoted 101, 103 and 105 are or may be like the units of the first embodiment herein described, or may be of other suitable construction. Preferably, unit 105 comprises means to attenuate any high frequency voltage which may be present as electrical noise in the transducer or sensor leads. The output of the squaring circuit may be, for example, clamped at 8 volts on the negative-going portion of the cycle, with the square wave signal going to zero volts during the positive half-waves of the transducer signal.

The input circuitry connected to the signal input terminals of op amp A3 is a frequency-doubling discriminator circuit. Capacitor C1 charges and discharges alternately with successive half-cycles of the input signal square wave. A resultant charge transfer takes place between capacitors C2, C3 and C4, causing the voltage at the R2–C3 junction to increase with frequency, and that at the R1–C2 junction to decrease with frequency of the square wave. The output network R5–CR4 and R7–CR5 provides a low speed drop out clamp for the converter output, preventing any output at speeds below a selected speed, so that low speed ground movements such as taxiing and turning are not affected by the control system.

The velocity comparator unit 109 comprises a differential op amp A4 that is effective to compare the analog wheel speed voltage at the inverting input terminal with the velocity reference voltage of the output signal of unit 113. The difference between the two signals is amplified and transmitted as the comparator output signal. The output of the comparator circuit drives the PBM and transient control loops, presently to be described, with a positive-going potential for a negative-going wheel speed signal.

The circuit of the velocity reference unit 113 comprises an operational integrator whose output signal is equivalent to the instant velocity of the vehicle. The R13–CR9 net provides a unilateral feedback which forces the output signal of the velocity reference unit to track the wheel speed voltage to initial condition at spin up of the wheel. The noted net is driven by the comparator output during spin up. The comparator output is driven negatively at wheel spin up, which action draws current out of the inverting input of A5, forcing the output positive until the two inputs to the comparator balance. When the input signals become balanced the comparator output returns to its quiescent level, preventing any further increase of the velocity reference voltage. The resistor R12, by injecting more current into the input of op amp A5, aids in simulating aerodynamic drag.

The driving function or signal for the velocity reference, during braking is derived from the deceleration reference control unit 111, via the connection represented by the heavy black line from the output of op amp A6' to the negative input terminal of A5.

The output voltage of unit 113 in terms of input drive current is expressed mathematically by $V_R = 1/C_7 \int i_{IN} dt$, in which $V_R$ is output potential, $C_7$ is the capacitance of C7 and $i_{IN}$ is the input current. The input current is proportional to the drag force acting on the vehicle, and the capacitance is an analog of aircraft mass.

The deceleration reference control unit 111 circuitry is a self-adaptive drive for the velocity reference unit 113. The output at junction J6' carrying the output of op amp A6' of unit 111 is proportional to the average deceleration of the vehicle as derived from the wheel speed signal. The unit functions as a low pass differentiator which operates on the wheel speed signal that appears at junction J3 in the output circuit of op amp A3 and is applied to the positive input terminal of op amp A6. The output of the deceleration reference control unit 111 is the derivative of the slowly changing component of the wheel speed signal voltage, the higher frequency components being attenuated. Thus, since the slowly changing component of the wheel speed signal is due to vehicle deceleration, the output signal of unit 111 is proportional to the vehicle decelerating drag forces.

The PBM control unit 117 is the principal controlling means for effecting normal brake pressure correction. The driving input to the unit is the velocity error signal voltage from op amp A4 of the velocity comparator unit 109, that signal being transmitted via, heavy line lead 04 (FIG. 3) from the output of A4 to the negative input signal terminal of op amp A7 of the PBM control unit. Op amp A7, in conjunction with capacitor C15 and resistors R24, R25, provides an operational integrator that integrates the velocity error signal from A4, to provide a smooth control voltage. The divider network comprising resistors R26, R27 and R28 provides a velocity departure threshold for PBM control, by summation of the signals at the inverting input terminal of op amp A7. Current flow through resistor R26 is away from the inverting input line; however the current from the velocity error signal line 04 through resistors R24, R25 is toward the inverting input, and hence the two currents are subtractive.

The output of the velocity comparator unit 109 and representing the transient control signal, and the output of the PBM control unit 117 and representing the normal control signal, are applied as inputs to the summing op amp A8 of the summing amplifier and transient control unit 115 for summation for control of the valve driver unit 119. The PBM signal is applied to inverting input of A8 through resistor R29, and the transient control signal is applied to the non-inverting signal input terminal of op amp A8 as shown. The transient control error signal threshold is established by a divider network comprising resistors R32 and R31 and rectifier CR19. The error signal threshold is such that the transient control component does not affect the valve driver unit and control valve unit the velocity error output signal of comparator unit 109 op amp A4 exceeds a level equivalent to a greater than normal rate of wheel deceleration. When that threshold value is exceeded, rectifier CR19' conducts and the conducted signal drives the non-inverting input of op amp A8 through resistor R35. The PBM control signal is the time integral of the velocity error signal from the velocity comparator unit 109, and the transient control signal is the velocity error signal amplified.

The output of the summing amplifier and transient control unit 115 is supplied to the valve driver unit 119. The latter unit comprises a control transistor Q1 and first and second current transistors Q2 and Q3 whose currents are used to energize the coil of a servo valve such as the primary valve of the previously described system. Maximum valve current is clamped by a divider network including resistors R38 and R38' and rectifier CR20. When the input voltage at the output of op amp A8 increases to the point at which diode CR20' conducts, diode CR20 shuts off, and base drive to transistor Q1 is thus clamped to limit the maximum valve drive current.

In the circuitry shown, capacitor C17 connected to junction J6' (FIG. 3a) and to the non-inverting input terminal of op amp A8 is termed a lead capacitor; and capacitor C17', connected between the input terminal and ground is termed a lag capacitor.

In the event the wheel circuit for either wheel fails, a failure signal (not shown) is energized in known manner. Thereupon the operator or pilot of the vehicle may optionally operate a switch S schematically depicted in FIG. 3b, whereby the valve units 121 for wheel 1 and 121' for wheel 2 are disconnected from their respective valve driver units 119 and 119', respectively, and concurrently the output of op amp A8 of the remaining operative wheel circuit is connected by one or the other of diodes CR21 and CR21' to the input terminal of a paired valve driver unit 123 which is common to the two wheels of the pair and which unit comprises a second valve device and connections thereto whereby the wheel circuit remaining active controls the brake-relieving of the brakes of both of the wheels.

In the valves 121 and 121', lapping of ports and passages is relied upon to provide some alleviation of hydraulic lag in the braking system.

The exemplary circuitry of FIGS. 3, 3a and 3b comprises circuit elements the significant values or characteristics of which are made evident in the following Table II. An outstanding difference between the modified embodiment of the invention and that illustrated in FIGS. 1, 2a and 2b is that in the latter the velocity reference is produced from signals emanating from all of the wheel circuits whereas in the modified form each wheel circuit produces its own individual velocity reference. In the modified form the concept of the ratio of mass of vehicle to mass of wheel is novel. Thus, as is indicated by the mathematical analysis herein, the values of certain circuit components depend upon the vehicle to wheel mass ratio.

TABLE II

| C1 | 0.01 mfd | R' | 38.3 K ohms | CR1 | IN645 |
|---|---|---|---|---|---|
| C2 | 6.8 mfd | R1 | 1 K ohms | CR2 | " |
| C3 | 6.8 mfd | R2 | 1 K ohms | CR3 | " |
| C4 | 100 pfd | R3 | 2 K ohms | CR4 | " |
| C5 | 0.10 mfd | R4 | 38.3 K ohms | CR5 | " |
| C6 | 100 pfd | R5 | 3.9 K ohms | CR6 | " |
| C7 | 10 mfd | R6 | 200 K ohms | CR7 | " |
| C8 | 100 pfd | R7 | 1.5 K ohms | CR8 | " |
| C9 | 0.47 mfd | R8 | 75 K ohms | CR9 | " |
| C10 | 100 pfd | R9 | 301 K ohms | CR10 | " |
| C11 | 10 mfd | R10 | 51.1 K ohms | CR11 | " |
| C12' | 10 mfd | R11 | 51 K ohms | CR12 | " |
| C13 | 2.2 mfd | R12 | 1 megohm | CR13 | " |
| C14 | 100 pfd | R13 | 4.3 K ohms | CR14 | " |
| C15 | 2.2 mfd | R14 | 20 K ohms | CR15 | " |
| C16 | 100 pfd | R15 | 200 K ohms | CR16 | " |
| C17 | 0.033 mfd | R16 | 20 K ohms | CR17 | " |
| C17' | 0.022 mfd | | | | |
| C18 | 100 pfd | R17 | 200 K ohms | CR18 | " |
| C19 | 110 pfd | R18 | 187.3 K ohms | CR19 | " |
| A3 | 809CE | R19 | 1 megohm | CR19' | " |
| A4 | 809CE | R20 | 200 K ohms | CR20 | " |
| A5 | 809CE | R21 | 9.09 K ohms | CR21 | " |
| A6 | 809CE | R22 | 100 K ohms | CR21' | " |
| A7 | 809CE | R23 | 100 K ohms | CR22 | " |
| A8 | 809CE | R23' | 1.24 K ohms | CR23 | " |
| Q1 | 2N930 | R24 | 1.24 K ohms | CR24 | " |
| Q2 | 2N2605 | R25 | 2.26 K ohms | CR25 | " |
| Q3 | 2N1893 | R26 | 130 K ohms | CR26 | " |
| | | R27 | 2.67 K ohms | CR27 | " |
| | | R28 | 24.3 K ohms | | |
| | | R29 | 127 K ohms | | |
| | | R30 | 562 K ohms | | |
| | | R31 | 10 K ohms | | |
| | | R32 | 2 K ohms | | |
| | | R33 | 93 K ohms | | |
| | | R34 | 49.9 K ohms | | |
| | | R35 | 178 K ohms | | |
| | | R36 | 150 K ohms | | |
| | | R37 | 45.3 K ohms | | |
| | | R38 | 3.65 K ohms | | |
| | | R38' | 4.22 K ohms | | |
| | | R39 | 110 K ohms | | |
| | | R39' | 3.9 K ohms | | |
| | | R41 | 3.01 K ohms | | |
| | | R42 | 3.01 K ohms | | |
| | | R43 | 130 K ohms | | |
| | | R44 | 1 K ohms | | |
| | | R45 | 51.1 K ohms | | |
| | | R46 | 130 ohms | | |
| | | R47 | 51.1 K ohms | | |
| | | R48 | 432 ohms | | |

While the particular braking control system for aircraft, vehicles and the like, herein shown and disclosed in detail is fully capable of attaining the objects and providing the advantages hereinbefore stated, it is to be understood that it is merely illustrative of the presently preferred embodiments of the invention.

I claim:

1. In a system for modifying the action of the brake application means for the wheel of a vehicle including electronic means responsive to rotation of said wheel for producing an analog error signal indicating a braking condition, the improvement comprising:
    means responsive to said analog error signal for producing a modulating brake control signal when said analog error signal exceeds a predetermined threshold level, said modulating brake control signal including a time integral function of both positive and negative variations of said analog error signal from said threshold level; and
    control means responsive to said modulating brake control signal for modifying the action of said brake application means in proportion to said modulating brake control signal.

2. The invention defined in claim 1 wherein said means responsive to said analog error signal comprises:
    integrating energy storage means;
    means responsive to said analog error signal to produce a charging signal tending to charge said energy storage means;
    means for producing a predetermined discharge signal tending continuously to discharge said energy storage means and indicative of said predetermined threshold level; and
    means for producing said brake control signal as a function of the difference between said charging signal and said discharging signal.

3. The invention defined in claim 1 wherein said means responsive to said analog error signal comprises:
    integrating capacitor means;
    means responsive to said analog error signal to produce a charging current tending to charge said capacitor means;
    means for producing a predetermined discharge current tending continuously to discharge said capacitor means and indicative of said predetermined threshold level; and
    means for producing said brake control signal as a function of the difference between said charging current and said discharging current.

4. In a system for modifying the action of the brake application means for the wheel of a vehicle including electronic means utilizing information obtained from the rotation of said wheel for producing an error signal indicating a braking condition, the improvement comprising:

modulation means responsive to said error signal for producing a modulating brake control signal when said error signal exceeds a predetermined threshold level, said modulation means including energy storage means, means responsive to said error signal to produce a charging signal tending to charge said energy storage means, means for producing a predetermined discharge signal tending continuously to discharge said energy storage means and indicative of said predetermined threshold level, means for producing said modulating brake control signal as a function of both positive and negative difference between said charging signal and said discharging signal; and control means responsive to said modulating brake control signal for modifying the action of said brake application means in proportion to said modulating brake control signal.

5. The invention defined in claim 4 wherein the rate of change of said modulating brake control signal is substantially a linear function of the magnitude of variation of said error signal from said predetermined threshold level.

6. The invention defined in claim 4 wherein said energy storage means comprises a capacitor means and wherein said charging signal and said discharge signal are each current signals.

7. In a system for modifying the action of the brake application means for the wheel of a vehicle including electronic means responsive to rotation of said wheel for producing a slip error signal, the improvement comprising:

modulation means responsive to said slip error signal for producing a modulating brake control signal when said slip error signal exceeds a predetermined threshold level, said modulating brake control signal including a time integral function of both positive and negative variation of said slip error signal from said threshold level, said modulation means including energy storage means, means responsive to said slip error signal to produce a charging signal tending to charge said energy storage means, means for producing a predetermined discharge signal tending continuously to discharge said energy storage means and indicative of said predetermined threshold level, and means for producing said modulating brake control signal as a function of both positive and negative difference between said charging signal and said discharging signal, both positive and negative rates of change of said modulating brake control signal being substantially linear functions of the magnitude of variation of said error signal from said predetermined threshold level; and control means responsive to said modulating brake control signal for modifying the action of said brake application means in proportion to said modulating brake control signal.

8. The invention defined in claim 7 wherein said energy storage means comprises a capacitor means and wherein said charging signal and said discharge signal are each current signals.

* * * * *

UNITED STATES PATENT OFFICE
CERTIFICATE OF CORRECTION

Patent No. 3,729,234          Dated April 24, 1973

Inventor(s) Edgar A. Hirzel

It is certified that error appears in the above-identified patent and that said Letters Patent are hereby corrected as shown below:

Column 6, line 47, "directed" should be --directly--.

Column 10, line 61, "50" should be --so--.

Column 14, line 11, after "initial" insert --transient--.

Column 14, line 55, " 65" should be --56--.

Signed and sealed this 16th day of July 1974.

(SEAL)
Attest:

McCOY M. GIBSON, JR.
Attesting Officer

C. MARSHALL DANN
Commissioner of Patents

UNITED STATES PATENT AND TRADEMARK OFFICE
CERTIFICATE OF CORRECTION

PATENT NO. : 3,729,234
DATED : April 24, 1973
INVENTOR(S) : Edgar A. Hirzel

It is certified that error appears in the above-identified patent and that said Letters Patent are hereby corrected as shown below:

In the drawing, Sheet 5 of 6, Figure 3a, the junction between diode CR13 and ground should be deleted.

Signed and Sealed this

Eleventh Day of July 1978

[SEAL]

Attest:

RUTH C. MASON
Attesting Officer

DONALD W. BANNER
Commissioner of Patents and Trademarks